US010232545B2

(12) United States Patent
Maki et al.

(10) Patent No.: US 10,232,545 B2
(45) Date of Patent: Mar. 19, 2019

(54) MACHINE COMPONENT FACILITATING MOLD BASE MOVEMENT

(71) Applicant: Amcor Rigid Plastics USA, LLC, Wilmington, DE (US)

(72) Inventors: Kirk Edward Maki, Tecumseh, MI (US); Theodore F. Eberle, Ann Arbor, MI (US)

(73) Assignee: Amcor Rigid Plastics USA, LLC, Wilmington, DE (US)

( * ) Notice: Subject to any disclaimer, the term of this patent is extended or adjusted under 35 U.S.C. 154(b) by 169 days.

(21) Appl. No.: 15/123,011

(22) PCT Filed: Mar. 3, 2015

(86) PCT No.: PCT/US2015/018395
§ 371 (c)(1),
(2) Date: Sep. 1, 2016

(87) PCT Pub. No.: WO2015/134429
PCT Pub. Date: Sep. 11, 2015

(65) Prior Publication Data
US 2017/0072617 A1     Mar. 16, 2017

Related U.S. Application Data

(60) Provisional application No. 61/947,011, filed on Mar. 3, 2014.

(51) Int. Cl.
*B29C 49/28* (2006.01)
*B29C 49/30* (2006.01)
(Continued)

(52) U.S. Cl.
CPC .............. *B29C 49/28* (2013.01); *B29C 49/14* (2013.01); *B29C 49/30* (2013.01); *B29C 49/42* (2013.01);
(Continued)

(58) Field of Classification Search
None
See application file for complete search history.

(56) References Cited

U.S. PATENT DOCUMENTS 4,134,510 A     1/1979  Chang
6,277,321 B1    8/2001  Vailliencourt et al.
(Continued)

FOREIGN PATENT DOCUMENTS

CN      101500781 A     8/2009
DE        2705775 B1    8/1978
(Continued)

OTHER PUBLICATIONS

Extended European Search Report in issued in corresponding European Patent Application No. 18160711.0 dated May 24, 2018.
(Continued)

*Primary Examiner* — Monica A Huson
(74) *Attorney, Agent, or Firm* — Harness, Dickey & Pierce, P.L.C.

(57) ABSTRACT

A blow molding machine assembly configured to be mounted to a blow molding machine to move a mold base configured to form a container base. The blow molding machine assembly includes an over-stroke cylinder and a counter-stretch rod. The over-stroke cylinder is configured to move the mold base between an extended base position and a retracted base position. The counter-stretch rod is movable between a retracted rod position in which the counter-stretch rod does not extend out from within the mold base, and an extended rod position in which the counter-stretch rod extends out from within the mold base.

35 Claims, 10 Drawing Sheets

(51) Int. Cl.
*B29C 49/42* (2006.01)
*B29C 49/14* (2006.01)
*B29C 49/70* (2006.01)
B29K 105/00 (2006.01)
B29L 31/00 (2006.01)
*B29C 49/48* (2006.01)
*B29C 49/54* (2006.01)
*B29C 49/02* (2006.01)

(52) U.S. Cl.
CPC .......... *B29C 49/70* (2013.01); *B29C 49/4815* (2013.01); *B29C 49/541* (2013.01); *B29C 2049/024* (2013.01); *B29C 2049/4892* (2013.01); *B29C 2049/702* (2013.01); *B29K 2105/253* (2013.01); *B29L 2031/712* (2013.01); *B29L 2031/7158* (2013.01)

(56) References Cited

U.S. PATENT DOCUMENTS

| | | | |
|---|---|---|---|
| 8,235,704 B2 * | 8/2012 | Kelley | B65D 1/0276 264/531 |
| 8,354,054 B2 | 1/2013 | Haesendonckx et al. | |
| 2009/0278288 A1 | 11/2009 | Haesendonckx et al. | |
| 2010/0301524 A1 | 12/2010 | Trude et al. | |
| 2012/0306127 A1 | 12/2012 | Geltinger et al. | |
| 2014/0054829 A1 | 2/2014 | Poo | |

FOREIGN PATENT DOCUMENTS

| | | |
|---|---|---|
| EP | 1358054 B1 | 7/2005 |
| JP | H04131220 A | 5/1992 |
| JP | H05345350 A | 12/1993 |
| JP | 2000102970 A | 4/2000 |
| WO | WO-8907554 A1 | 8/1989 |
| WO | WO-2013147065 A1 | 10/2013 |

OTHER PUBLICATIONS

XP-002781345, WPI / 2017 Clarivate Analytics.
XP-002781346, WPI / 2017 Clarivate Analytics.
XP-002781347, WPI / 2017 Clarivate Analytics.
International Search Report and Written Opinion for PCT/US2015/018395, dated May 22, 2015; ISA/KR.
Office Action dated Sep. 6, 2017 in corresponding Colombian Patent Application No. NC2016/0001450.
Office Action dated Oct. 6, 2017 in corresponding European Patent Application No. 157591363.

* cited by examiner

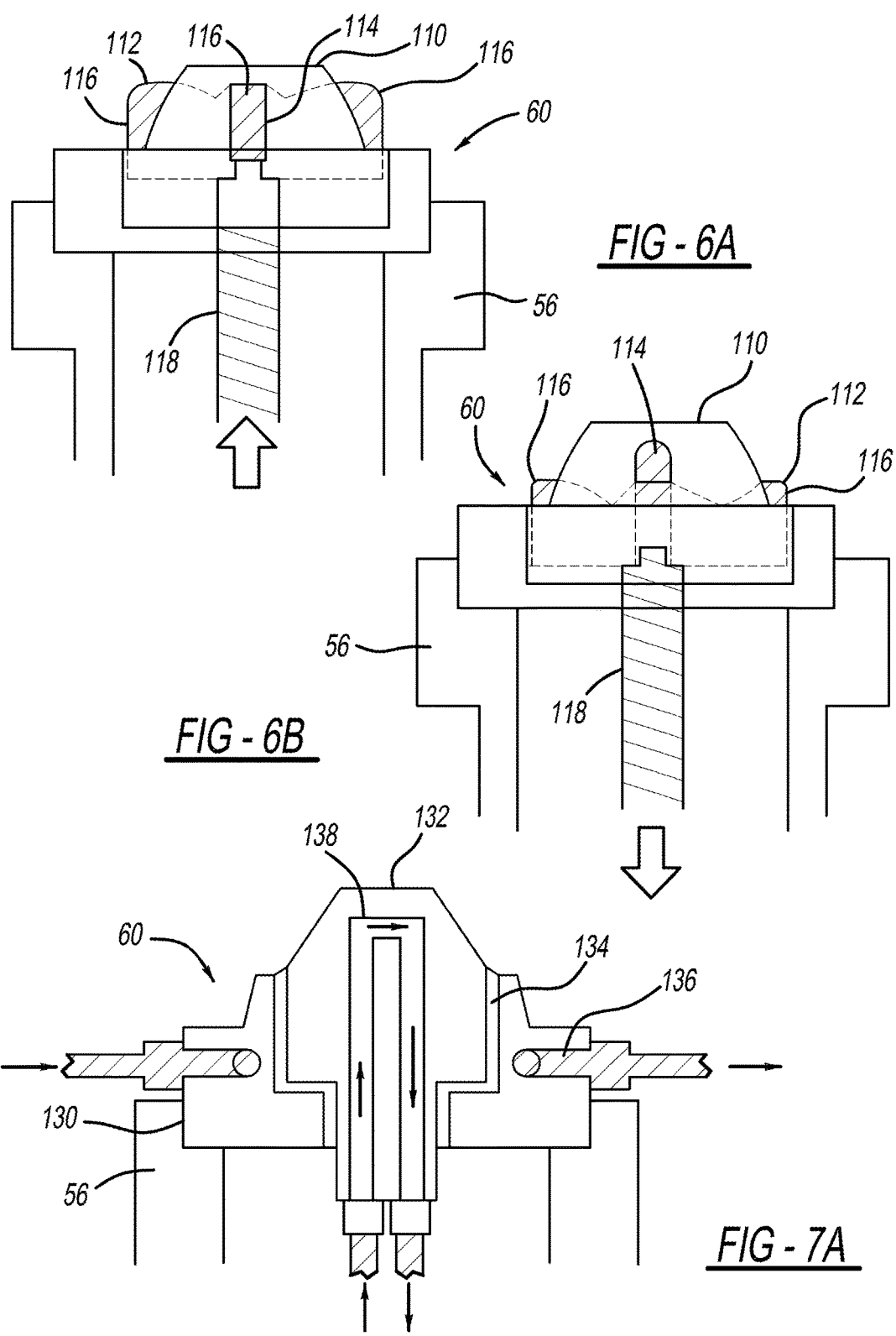

MACHINE COMPONENT FACILITATING MOLD BASE MOVEMENT

CROSS-REFERENCE TO RELATED APPLICATIONS

This application is a U.S. National Phase Application under 35 U.S.C. 371 of International Application No. PCT/US2015/018395 filed on Mar. 3, 2015 and published as WO 2015/134429 A1 on Sep. 11, 2015. This application claims the benefit and priority of U.S. Provisional Patent Application No. 61/947,011, filed on Mar. 3, 2014. The entire disclosures of all of the above applications are incorporated herein by reference.

FIELD

The present disclosure relates to an assembly for a blow molding machine that facilitates movement of a mold base, and/or additional components of the mold base.

BACKGROUND

This section provides background information related to the present disclosure, which is not necessarily prior art.

Vacuum absorbing blow molded bases for use in hot-filled containers, such as polyethylene terephthalate (PET) containers, can be formed by over-stroke and counter-stretch blow-molding operations to create lighter weight base geometry with reduced average wall thickness as compared to conventional PET container bases. The over-stroke and counter-stretch blow-molding operations also allow for more aggressive geometric features to be formed, such as a deeper upstanding internal base wall and vacuum absorbing diaphragms with improved material distribution, stretch, and crystallization properties. The process facilitates fine material distribution control in both the axial and radial orientation directions, counter to the natural stretching and orientation behaviors of bottle grade PET polymeric materials.

Because stretching is fully controlled, it can be accomplished over the broadest range of temperatures. Higher temperatures reduce flexural modulus and molecular entanglement, and therefore require less pressure force to extend the molecular networks via the strain hardening mechanism. Orientation at the highest feasible temperatures, i.e., at the threshold of, or just below, 130° C. where the kinetics of thermally induced crystallization begin to dominate, are conducive to generation of fine crystalline entanglements. Orientation over the ideal range of ratios and temperatures provides resistance to retraction and distortion, imparting both transparency and thermal stability when re-exposed to temperatures above the Glass Transition Temperature of PET (Tg nominally=77° C.-80° C. for bottle grade PET resin grades suitable for heat set processing) during hot filling processes. One can anticipate achieving crystallinity levels (as measured by changes in density, infrared absorption, or Wide Angle X-Ray Scattering) on the order of 3%-5% higher than are achievable without the enhanced, fine material distribution and orientation control imparted by the use of a Counter-Stretching mechanism.

Therefore, a system that extends the range of utility of counter-stretching and over-stroking mechanisms has broad application to hot fillable packaging designs across the greatest range of sizes and processing conditions. Over-stroke can be defined by the mold components and process that facilitates the base geometry of a container being formed initially with the base component retracted from the mold, and a final step that moves the base component into the mold. The initial step forms the desired material properties such as surface area, thickness, and crystallinity. The final step forms the base shape and geometry of the final container.

Counter-Stretch can be defined by the mold components and process required to actuate a guide rod into the mold cavity and contact the external underside surface of a preform. The preform is captured between a stretch rod inside the preform and the counter-stretch rod as it is stretched and guided to its final position at the bottom of the container.

The over-stroke and counter-stretch operations can be combined into a single unit including two cylinders that control movement of the blow mold base, which is mounted to a top of the over-stroke unit. This unit is sized for specific ranges of container height and diameter, and for each blow mold there is a corresponding over-stroke unit. Thus multiple over-stroke units of different sizes are required to make containers of different sizes and shapes, which increases production costs and complicates production. The present teachings address these issues by providing over-stroke/counter-stretch assemblies that can be used to make containers of various different sizes and shapes.

With reference to FIG. 1 for example, over-stroke base unit 1010 is mounted to a rotary blow molding machine component called the base assembly 1012, which is attached to a casting called the console 1014. The corresponding blow mold 1016 is attached to a mold hanger 1018 that is mounted to the console 1014 directly above the base assembly 1012. The base assembly 1012 is moved vertically upwards into place and the mold 1016 closes for blow molding of a container to occur. When the container is completely formed, the base assembly 1012 retracts for clearance, the mold 1016 opens, and the finished container is removed from the blow mold 1016. The vertical upward and downward movement is controlled by a cam on the blow molding machine and a spring mechanism on the base assembly 1012. The functions of the cam and spring may be reversed depending on the type of blow molding machine being used.

When the base assembly 1012 is in the upward position and the mold 1016 closes, central counter-stretch cylinder actuates a rod 1020 into the mold to help center and guide the external tip of a preform during the blow molding process. When the base assembly 1012 is in the upward position and the mold 1016 closes, the body and base of the container are stretched and formed beyond the final height of the container. At a precise moment in time, the over-stroke cylinder actuates mold base 1022 (attached to the over-stroke unit 1010) and forces the base material into the final shape and container height. When the container is fully formed with high pressure air, and air in the container exhausted, the counter-stretch-rod 1020 and the over-stroke base unit 1010 retract, then the base assembly retracts 1012 allowing the mold 1016 to open and the finished container is removed from the blow mold 1016.

This blow molding process generally includes the following steps: (1) heated preform is placed in blow mold; (2) base assembly is actuated (by cam or spring); (3) mold is closed; (4) counter-stretch cylinder actuates the counter-stretch rod; (5) stretch & blow process is initiated; (6) over-stroke cylinder actuates the base; (7) stretch and blow process is completed; (8) counter-stretch, over-stroke, and base assembly retract; (9) mold opens; and (10) finished container is removed from mold.

While the blow molding device and method described above is suitable for its intended purposes, it is subject to improvement. For example, a blow-molding device and method that provides for at least the following would be desirable: allows containers of an increased height to be produced, such as containers having a height of greater than 250 mm; allows containers of an increased base surface area to be produced, such as a surface area of greater than 110 cm$^2$; improves distribution of inertia during actuation of base over-stroke and counter-stretch; and addresses the complex, heavy, and costly over-stroke and counter-stretch mechanism associated with each mold set.

SUMMARY

This section provides a general summary of the disclosure, and is not a comprehensive disclosure of its full scope or all of its features.

The present teaching provide for a blow molding machine assembly configured to be mounted to a blow molding machine to move a mold base configured to form a container base. The blow molding machine assembly includes an over-stroke cylinder and a counter-stretch rod. The over-stroke cylinder is configured to move the mold base between an extended base position and a retracted base position. The counter-stretch rod is movable between a retracted rod position in which the counter-stretch rod does not extend out from within the mold base, and an extended rod position in which the counter-stretch rod extends out from within the mold base.

The present teachings include an over-stroke assembly for a blow molding machine. The over-stroke assembly generally includes a main body, an over-stroke cylinder, and a mold base. The main body is configured to be mounted to a console of the blow-molding machine. The main body defines a bore therein. The over-stroke cylinder is slidably mounted within the bore of the main body. The mold base is mounted to the over-stroke cylinder.

The present teachings further provide for a method for blow molding a container. The method includes: inserting a preform into a mold suspended above an over-stroke/counter-stretch assembly coupled to a blow molding machine; closing the mold; blowing the preform into the mold with an over-stroke cylinder of the assembly in a retracted position such that a mold base mounted to the over-stroke cylinder does not extend into the mold; stretching the preform into the mold with a stretch rod; guiding the preform into the mold with a counter-stretch rod as the preform is being stretched into the mold, the counter-stretch rod slidably mounted within the over-stroke cylinder; retracting the counter-stretch rod within the over-stroke cylinder as the preform is stretched; moving the over-stroke cylinder to an extended position to form a container base; moving the over-stroke cylinder, stretch rod, and counter-stretch rod back to the retracted position; opening the mold; and removing the container from the mold.

The present teachings thus generally combine operations of a base assembly movement, counter-stretch, and over-stroke into one assembly including an over-stroke cylinder with a counter-stretch device slidably movable therein to replace the cam/spring base assembly movement described above in the Background section. The assembly is not only sized for specific ranges of container height and diameter, but also for increased stroke length of a counter-stretch rod of the counter-stretch device. The over-stroke base unit 1010 (FIG. 1) described in the Background is no longer mounted to the rotary blow molding machine component referred to above as the base assembly 1012. Instead, the base assembly 1012 is eliminated and the over-stroke/counter-stretch assembly described herein is attached directly to the machine casting referred to as the console. The vertical upward and downward movement controlled by a cam on the blow molding machine and spring mechanism on the base assembly 1012 is effectively eliminated, and the motion is now performed by the over-stroke cylinder of the present teachings.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 6A illustrates a mold base according to the present teachings including a first portion and a second portion in a raised position;

FIG. 6B illustrates the second portion of FIG. 6B in a lowered position;

FIG. 7A illustrates another mold base according to the present teachings including a first portion and a second portion each with thermal liquid circuits;

Corresponding reference numerals indicate corresponding parts throughout the several views of the drawings.

DETAILED DESCRIPTION

Figure 1:
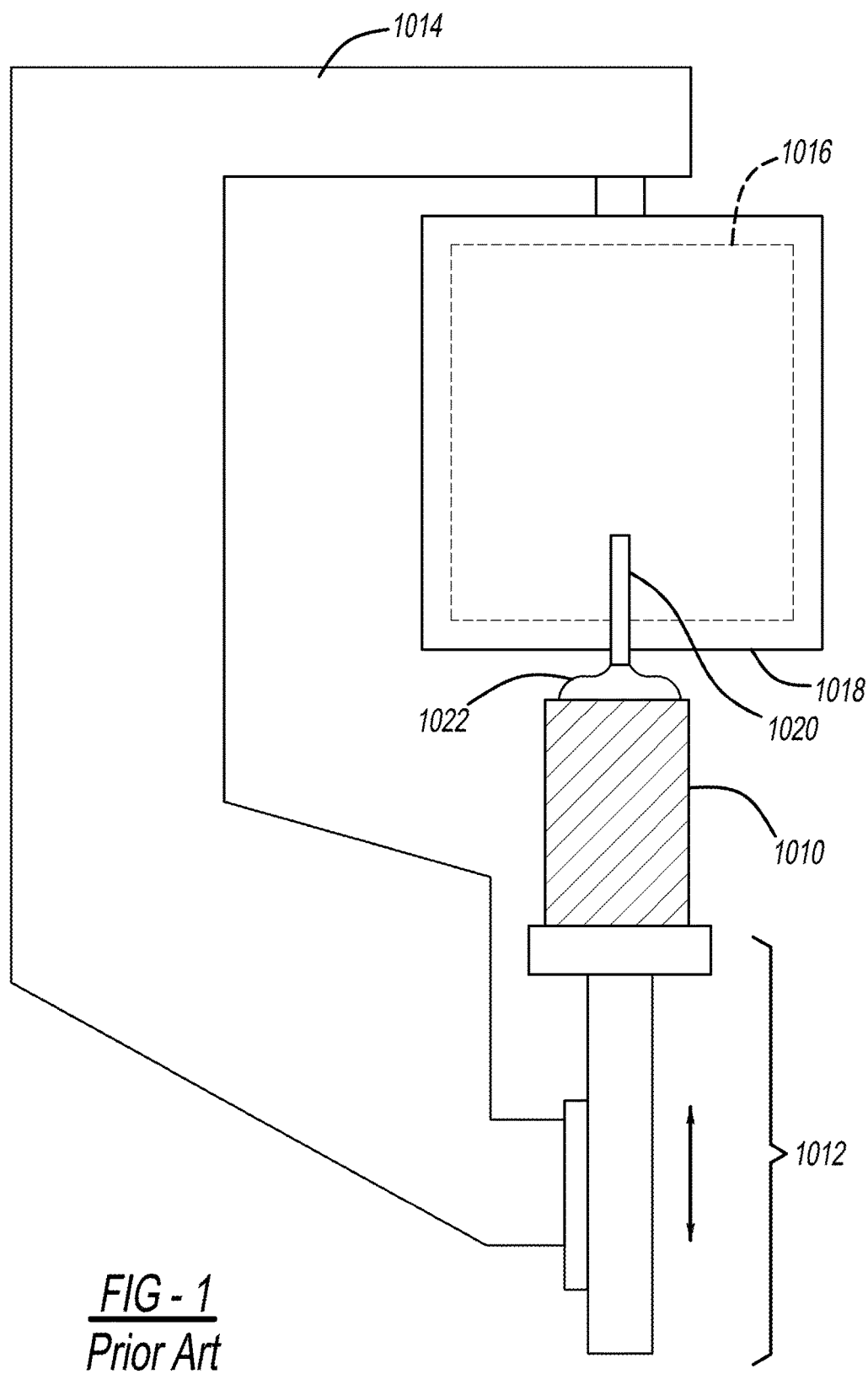
FIG. 1 illustrates a current blow molding assembly.
Figure 2:
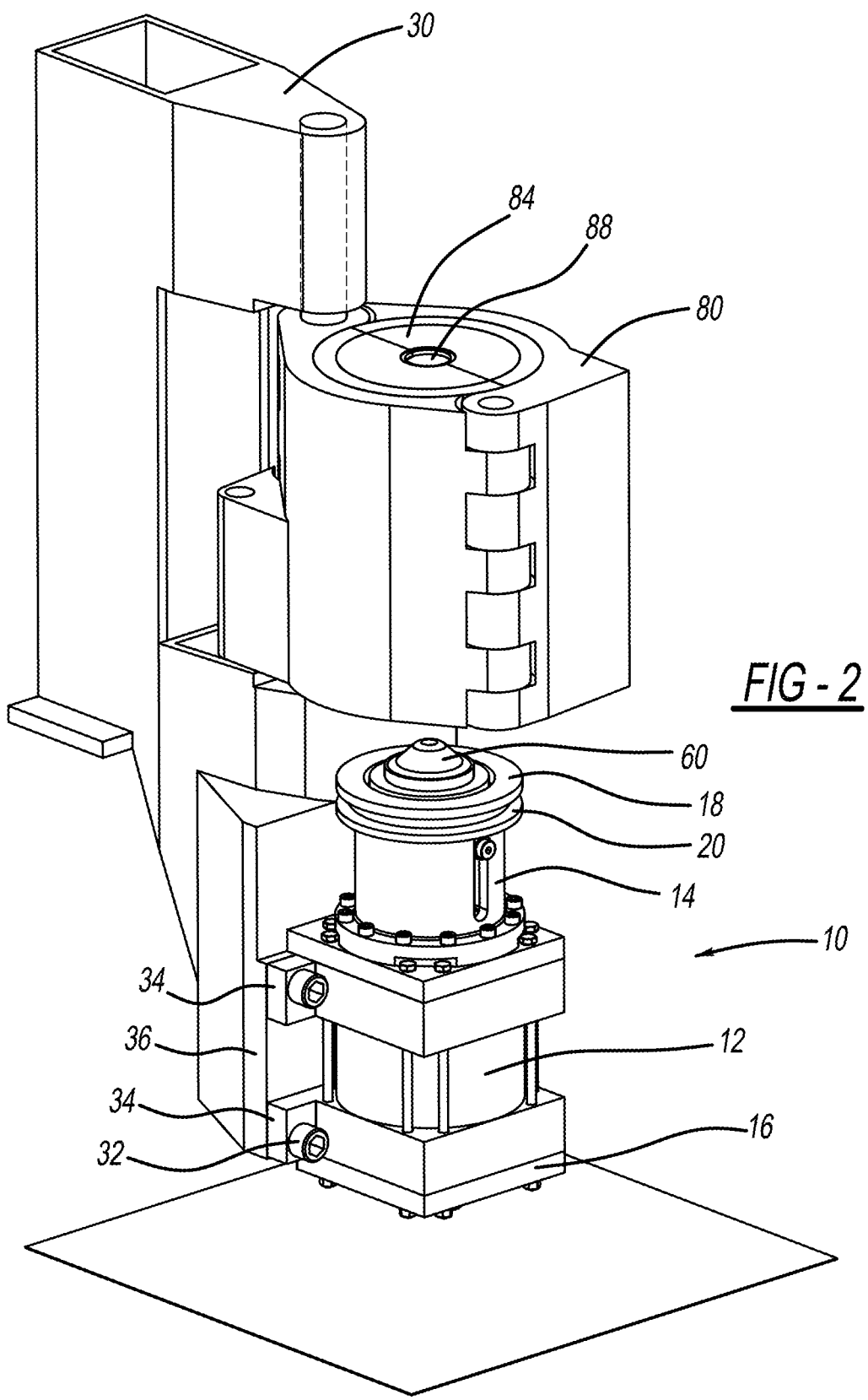
FIG. 2 is a perspective view of a blow molding assembly according to the present teachings in a closed position.
Figure 3:
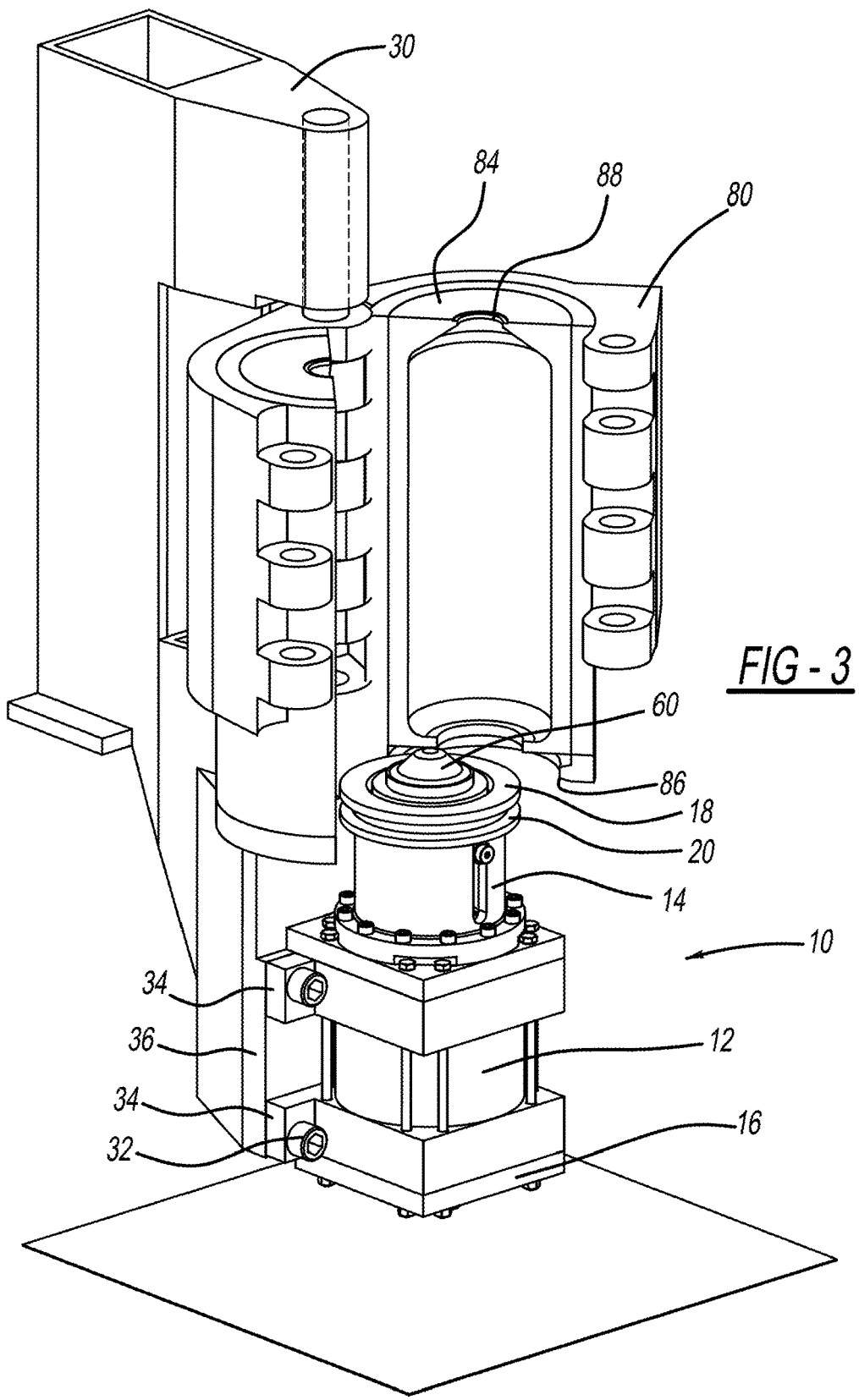
FIG. 3 is a perspective view of the blow molding assembly of FIG. 2 in an open position.

Example embodiments will now be described more fully with reference to the accompanying drawings.

With initial reference to FIGS. 2-5, an over-stroke/counter-stretch assembly according to the present teachings is generally illustrated at reference numeral 10. The assembly 10 generally includes a base portion 12 and a head portion 14, which together define, or at least partially define, a main body of the assembly 10. The base portion 12 and the head portion 14 can be individual components connected together in any suitable manner, as illustrated, or can be integral or monolithic with one another. In the example illustrated, the base portion 12 extends downward to a lower end 16 of the assembly 10. The head portion 14 extends upward to an upper end 18 of the assembly 10. At the upper end 18, the head portion 14 defines a recess 20, which can be an annular recess and is further described herein. The over-stroke/counter-stretch assembly 10 defines a bore or throughbore 22 (FIGS. 4 and 5 for example) extending between the lower end 16 and the upper end 18 of the assembly 10.

The assembly 10 is configured to be coupled to a console 30 of a blow molding machine, such as a two-step blow molding machine. The assembly 10 can be coupled to the console 30 in any suitable manner, such as with any suitable fastening device, including fasteners 32. The fasteners 32 may be used to couple a first mounting portion 34 of the assembly 10 to a second mounting portion 36 of the console 30. The assembly 10 may also be integral with the console 30.

Figure 4:
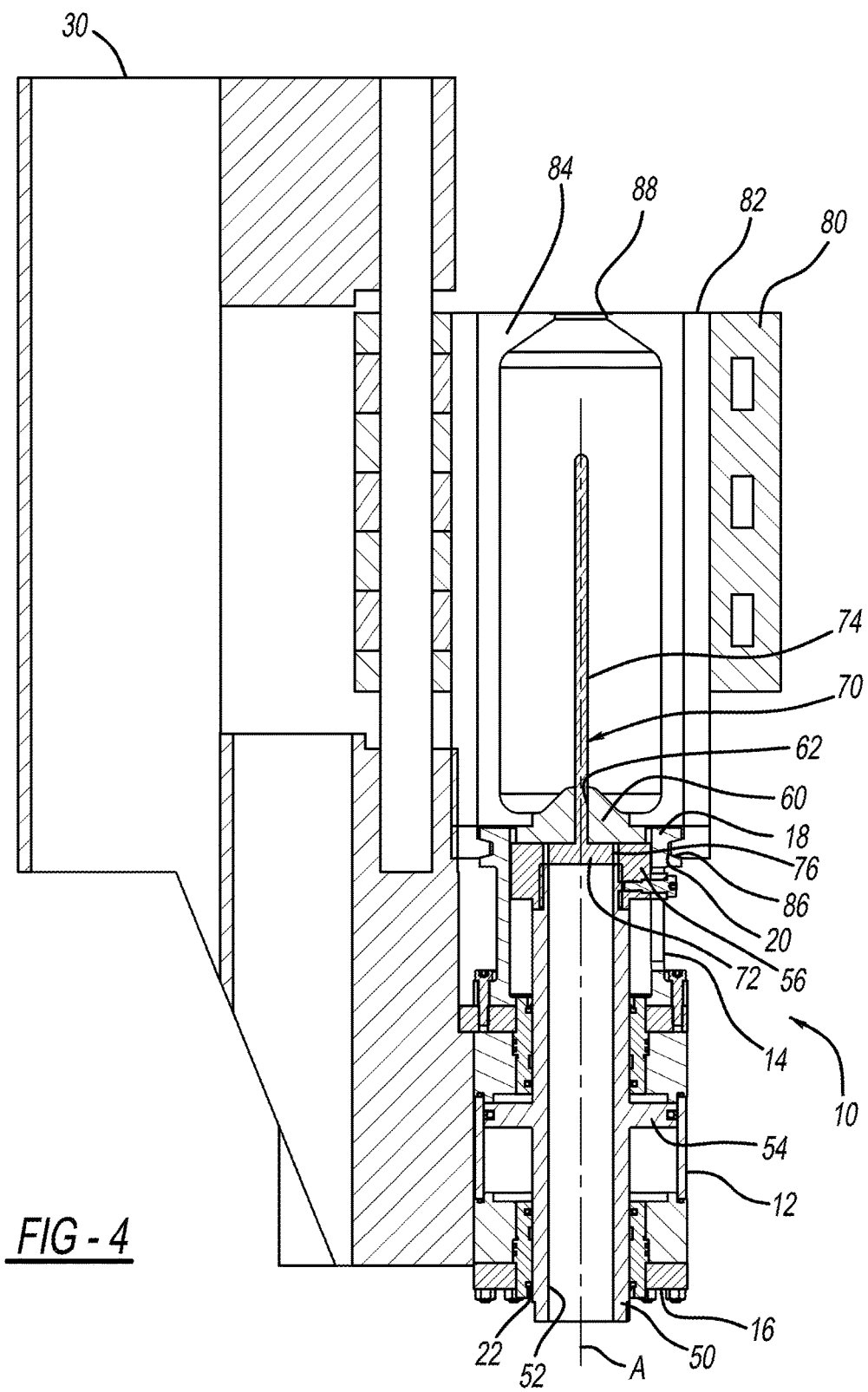
FIG. 4 is a cross-sectional view of the blow molding assembly of FIG. 2.
Figure 5:
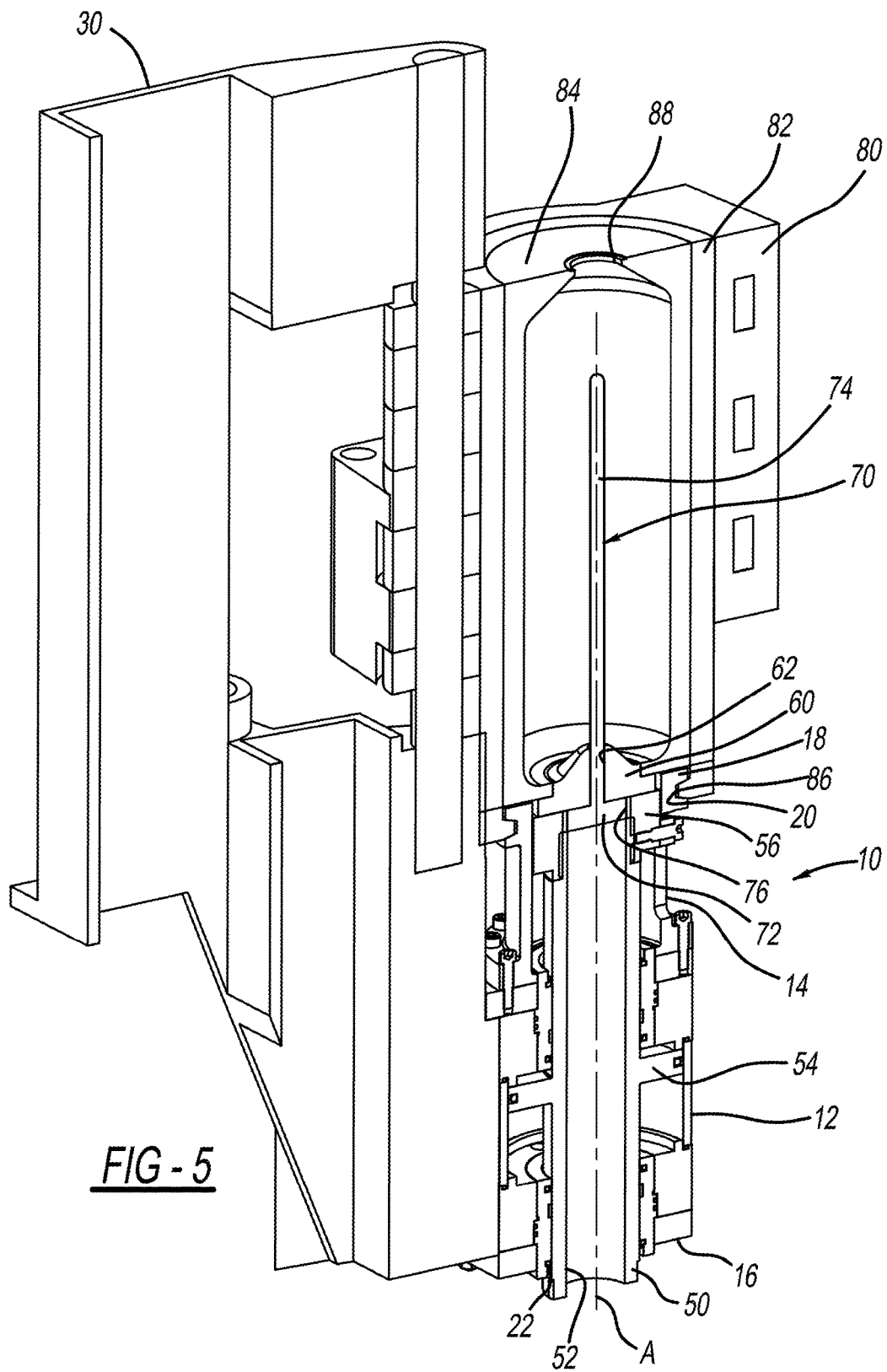
FIG. 5 is a perspective cross-sectional view of the blow molding assembly of FIG. 2.
Figure 7B:
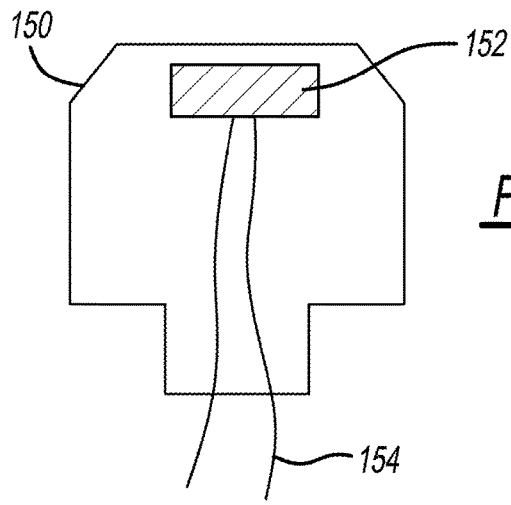
FIG. 7B illustrates another second portion for use with the mold base of FIG. 7A, the second portion of FIG. 7B including an electrical heating element.

With particular reference to FIGS. 4 and 5, for example, the over-stroke/counter-stretch assembly 10 further includes an over-stroke cylinder 50, which is seated within the throughbore 22. The cylinder 50 can be a toroidal cylinder, for example. The cylinder 50 is generally hollow and thus defines a hollow center 52. An area of the cylinder 50 can be greater than a maximum surface area of a mold base 60 (as projected on a flat surface) in order to overcome pressure applied by the container against the mold base 60 as the container is blown. The mold base 60 can be any suitable shape or size. For example, the mold base 60 can have an area that is equal to or less than 110 cm$^2$, as projected on a flat surface. Extending from an outer periphery of the cylinder 50 is a flange 54. The cylinder 50 is mounted within the throughbore 22 such that the cylinder 50 is able to move within the throughbore 22 generally along a longitudinal axis A thereof. More specifically, the cylinder 50 is configured to slidably move within the throughbore 22 between a lower position and a raised position. The raised position is illustrated in FIGS. 4 and 5.

A collar 56 is mounted to an upper end of the cylinder 50. The mold base 60 is mounted to the collar 56 and/or to an upper end of the over-stroke cylinder 50. Thus, movement of the cylinder 50 within the throughbore 22 causes the mold base 60 to move with the cylinder 50 between the lower position and the raised position. The mold base 60 is illustrated in the raised position in FIGS. 4 and 5. The over-stroke cylinder 50 can be moved within the throughbore 22 between the raised and lowered positions in any suitable manner using any suitable device or actuation method, configuration, or assembly. For example, the cylinder 50 can be moved using pressurized air, a spring mechanism, a servo, hydraulics, or any suitable pneumatic actuation.

The mold base 60 can define an aperture 62 extending therethrough. The aperture 62 can accommodate a counter-stretch device 70. The counter-stretch device 70 generally includes a counter-stretch base, cylinder or flange 72, and a counter-stretch rod 74 extending from the flange 72. The flange 72 is slidably mounted within the hollow center 52 of the over-stroke cylinder 50. The counter-stretch flange 72 is generally shaped to correspond to the shape of the hollow center 52, and can include a seal 76 about the outer diameter of the flange 72 to provide a generally air-tight seal between the flange 72 and the hollow center 52. The counter-stretch device 70 is optional and need not be included in some applications.

The flange 72 can be slidably moved along the longitudinal axis A of the hollow center 52 between a retracted position in which the flange 72 is proximate to the lower end 16 of the assembly 10, and an extended position in which the flange 72 is proximate to the upper end 18 of the assembly 10. FIGS. 4 and 5 illustrate the flange 72 in the extended position. In the retracted position, the counter-stretch rod 74 does not extend out from within, or does not extend substantially out from within, the mold base 60. In the extended position, the counter-stretch rod 74 substantially extends out from within the mold base 60 as illustrated FIGS. 4 and 5 so as to extend within a mold 84 further described herein. The counter-stretch device 70 can be slidably moved along the longitudinal axis of the over-stroke cylinder 50 in any suitable manner. For example, the counter-stretch device 70 can be moved with compressed air, a spring, any suitable servo, or any suitable pneumatic actuation.

The present teachings further provide for a hanger 80 for a mold holding unit 82, which is configured to hold the mold 84. The hanger 80 is configured to couple with the console 30 of a suitable blow molding machine. The mold 84 can be any suitable mold, such as a mold for a container. The mold 84 can be for any suitable container, such as a bottle, of any suitable size. For example, the assembly 10 can be configured to form containers having a base surface area greater than 100 cm$^2$. The mold holding unit 82 includes a locking ring 86 that is configured to be received within the recess 20 of the over-stroke/counter-stretch assembly 10 in order to lock, such as vertically lock, the mold holding unit 82 to the assembly 10. This restricts movement of the mold 84 relative to the assembly 10 during blow molding.

General operation of the over-stroke/counter-stretch assembly 10 during an exemplary blow molding process will now be described. A heated preform is placed within the mold 84, and the mold 84 is closed by the hanger 80 and the mold holding unit 82 so as to suspend the preform at the opening 88. As the mold holding unit 82 closes, the locking ring 86 thereof moves to within the recess 20 to vertically secure the mold 84 in position relative to the assembly 10.

The preform is then blown using any suitable blow molding process, and a stretch rod extends into the preform and towards the mold base 60 to stretch the preform towards the mold base 60 as the preform is blown. With the mold base 60 in a lowered position such that the mold base 60 does not extend into the mold 84, or does not substantially extend into the mold 84, the counter-stretch device 70 is actuated upward so that the counter-stretch flange 72 moves upward towards the mold base 60 and the counter-stretch rod 74 extends out through the aperture 62 of the mold base 60 and into the mold 84 as generally illustrated in FIGS. 4 and 5. Prior to stretching, the counter-stretch rod 74 is generally vertically aligned with the stretch rod and moves upward to contact an under surface of the preform being blown that is generally opposite to a surface that the stretch rod is pushing against as the preform is blown.

The stretch rod moves towards the mold base 60 to guide the preform as it is being blown. The counter-stretch rod 74 moves generally in tandem with the stretch rod, but in the opposite direction. The counter-stretch rod 74 thus moves back towards the mold base 60 guiding the preform, particularly the base of the preform, as the preform is being blown. The counter-stretch rod 74 and the stretch rod continue to move generally in tandem until the stretch rod reaches its maximum downward position. In at least one embodiment, the preform remains in contact with the stretch rod and counter-stretch rod 74 to keep the material centered and symmetric. Other timing combinations are possible as well.

After the preform is blown such that the bottom thereof is at the maximum degree of surface area to facilitate desired material distribution and shape, the over-stroke cylinder 50 is moved to the raised position in order to push the mold base 60 into the mold 84 as the stretch rod and the counter stretch rod 74 remain stationary, and forms a base of the object being blown, such as a container or bottle. The over-stroke cylinder 50 is configured to move vertically over a range of up to about 50 mm within an actuation time of 150 milliseconds or less, for example. After the mold base 60 has been moved up and into the mold 84 and the base of the container has been formed, the stretch rod retracts upward, the mold base 60 and the counter-stretch rod 74 retract downward at the same time (according to at least one embodiment), and the hanger 80 opens the mold 84 to permit the finished container to be removed from the mold 84. Any other sequencing may be performed as well. Other sequencing may be desired in some applications to help remove a container from the mold base 60, etc.

The present teachings thus combine operations of base assembly movement, counter-stretch, and over-stroke into one single unit, which is the over-stroke/counter-stretch assembly 10. The assembly 10 is not only sized for specific ranges of container heights and diameters, but permits optimizing the stroke length of the counter-stretch rod 74, for example, to replace cam and spring-based assembly movements found in conventional devices. Furthermore, the present teachings may eliminate the mounting of an over-stroke base unit to a base assembly mounted to the console 30. Instead, the present teachings provide for the over-stroke/counter-stretch assembly 10 directly mounted to the console 30. The vertical upward and downward movement typically controlled by a cam of previous blow molding machines and a spring mechanism is eliminated because the present teachings eliminate the base assembly of previous machines, such as the base assembly 1012 of FIG. 1.

With additional reference to FIGS. 6A, 6B, 7A, 7B, 8, 9, 10A, and 10B, the mold base 60 of the present teachings can include a variety of additional configurations. For example and as illustrated in FIGS. 6A and 6B, the mold base 60 can include a first portion 110 and a second portion 112. The first portion 110 can include a plurality of apertures 114 through which projections 116 of the second portion 112 can extend when the second portion 112 is in the raised position of FIG. 6A. The second portion 112 can be moved between the raised position of FIG. 6A and a lowered position of FIG. 6B by shaft 118 extending from the mold base 60 and into the hollow center 52 of the over-stroke cylinder 50. When the second portion 112 is in the lowered position of FIG. 6B, the projections 116 do not extend out from within the apertures 114, or do not substantially extend out from within the apertures 114. Raising the second portion 112 to the raised position of FIG. 6A can improve definition of the base of the container being blown. Specifically, more material can move past geometry of the mold base 60 so that less material is trapped by the mold base 60 as the container is being blown. This allows the container, and particularly the base thereof, to be formed at a reduced weight. After the container has been blown, the second portion 112 can be moved to the lowered position to prevent "sticking" of the container to the mold base 60 and break any vacuum around the mold base 60. The apertures 114 thus provide additional venting at the mold base 60.

With additional reference to FIG. 7A, the mold base 60 can include a first base portion 130, a second base portion 132, and an insulator 134 therebetween. The first base portion 130 can include a first passageway or first thermal liquid circuit 136. The second base portion 132 can include a second passageway or second thermal liquid circuit 138. The first thermal liquid circuit 136 can include any suitable coolant in order to cool the first base portion 130. The second thermal liquid circuit 138 can include any suitable liquid to heat the second base portion 132. The liquid can be introduced into, and received from, the second thermal liquid circuit 138 from within the hollow center 52 of the over-stroke cylinder 50. The second base portion 132 can be replaced with a second base portion 150 including electrical heating element 152 in order to electrically heat the second base portion 150 of the mold base 60. Current can be directed to the electrical heating element 152 with wires 154 extending therefrom and into the hollow center 52 of the mold base 60. The mold base 60 is heated to increase crystallinity growth in the amorphous and semi amorphous regions improving its thermal stability qualities. There may be other reasons a temperature differential may be desired, for ease of formation, etc.

Figure 8:
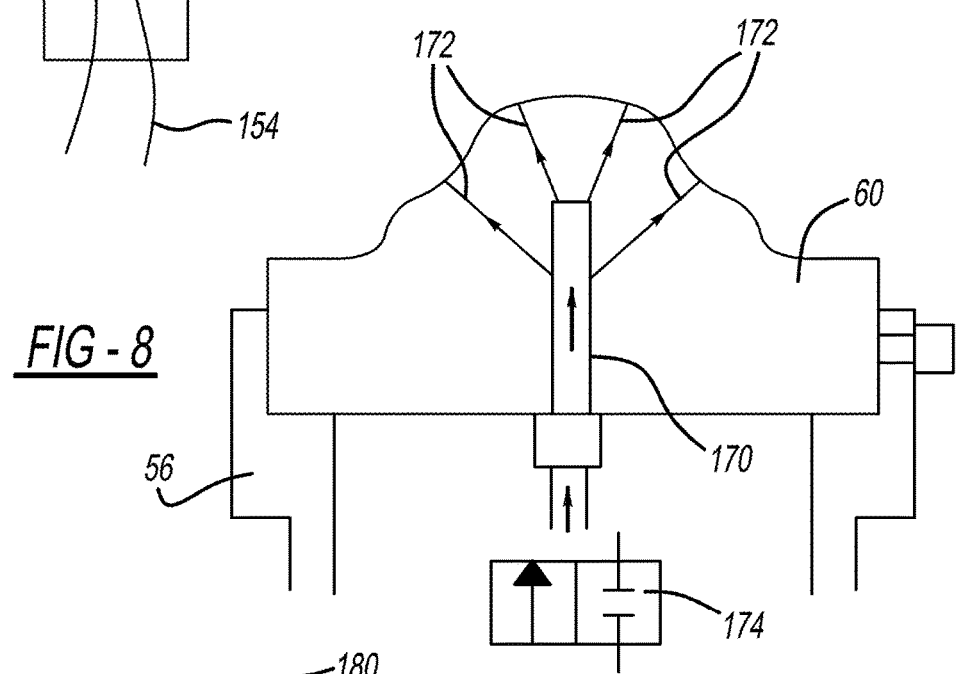
FIG. 8 illustrates another mold base according to the present teachings including air passageways.

With additional reference to FIG. 8, the mold base 60 can include a main passageway 170 extending from the hollow center 52 of the over-stroke cylinder 50 and into the mold base 60. Extending from the main passageway 170 to an upper and outer surface at the mold base 60 are a plurality of secondary passageways 172. Air can be introduced into the main passageway from a suitable air source, such as an air compressor 174, and can be pumped from the air compressor 174 through the hollow center 52 and to the main passageway 170. From the main passageway 170 the air flows through the secondary passageways 172 and into the mold 84 in order to facilitate removal of a blown container, or very precise additional cooling from the air.

Figure 9:
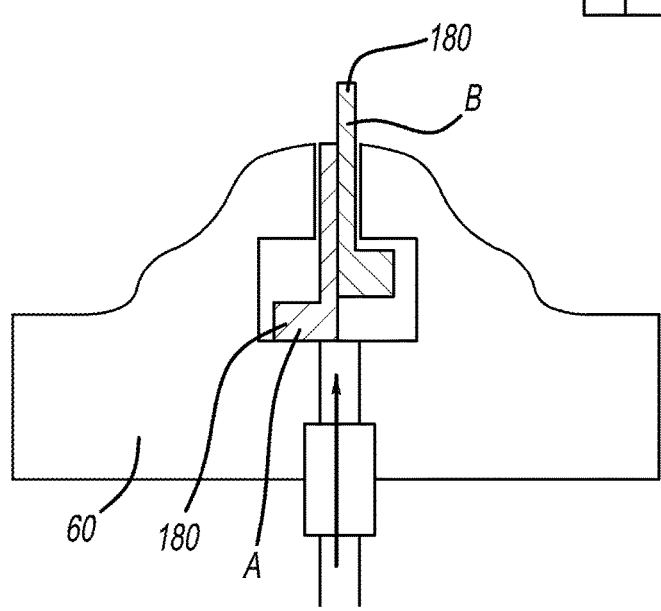
FIG. 9 illustrates yet another mold base according to the present teachings including a movable piston.
Figure 10:
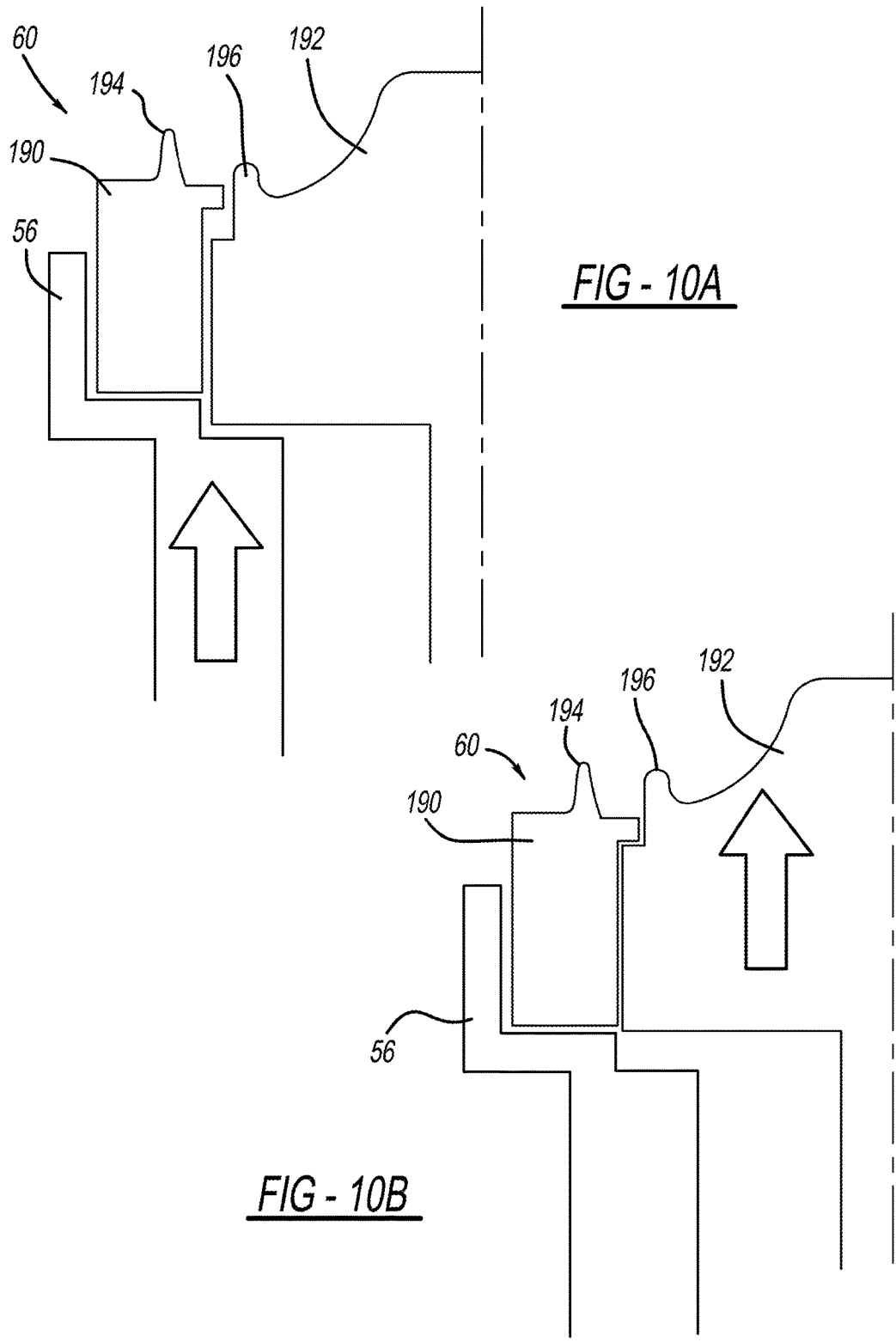
FIG. 10A illustrates an additional mold base according to the present teachings, the mold base including a stationary first portion surrounding a movable second portion, the second portion in a retracted position.
FIG. 10B illustrates the second portion of FIG. 10A in an extended position.

As illustrated in FIG. 9, the mold base 60 may further include a piston 180 movable from a retracted position A to an extended position B in which the piston 180 extends out from within the mold base 60 in order to facilitate removal of a blown container from within the mold 84. The piston 180 can be moved from the retracted position A to the extended position B in any suitable manner, such as with air pumped through the hollow center 52 of the over-stroke cylinder 50 and to the mold base 60 in order to facilitate removal of a blown container.

The mold base 60 can further include a first base portion 190 and a second base portion 192, which is movable relative to the first base portion 190. The first base portion 190 generally surrounds the second base portion 192. The first base portion 190 includes a first mold feature 194, and the second base portion 192 includes a second mold feature 196. As illustrated in FIG. 10A, the second base portion 192 can be arranged in a first position in which the second base portion 192 is generally recessed with respect to the first base portion 190, such that the first mold feature 194 extends further from the mold base 60 than the second mold feature 196. With reference to FIG. 10B, the second base portion 192 can be moved to an extended position in which the second base portion 192 extends further from within the mold base 60, such that the second mold feature 196 and the first mold feature 194 extend generally equidistant to one another. Because the second base portion 192 is able to move independently of the first base portion 190, the mold base 60 is able to better define features of the container base, as well as facilitate formation of base configurations and shapes that would otherwise be difficult to arrive at.

Figure 11:
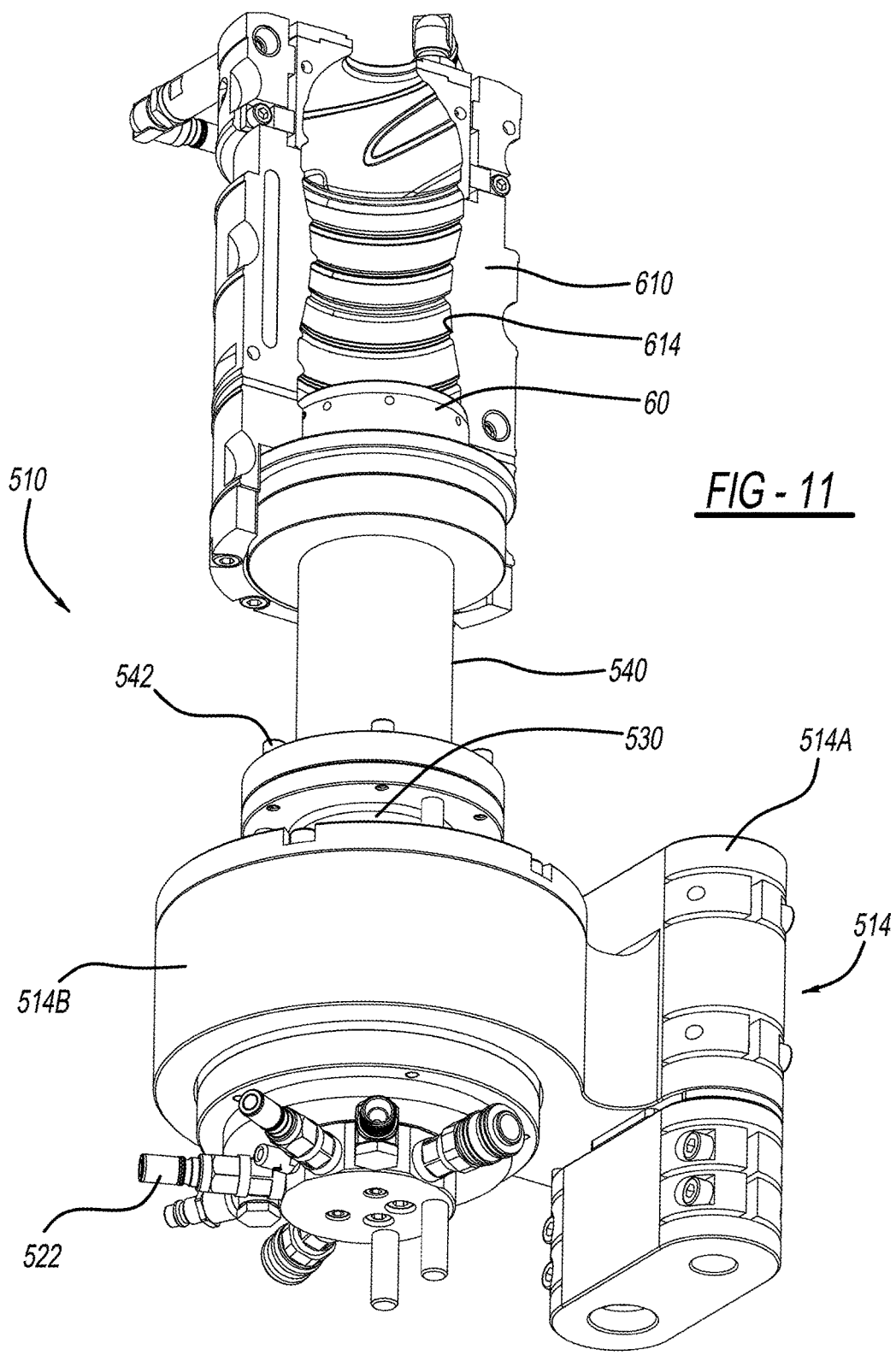
FIG. 11 is a perspective view of another blow molding assembly according to the present teachings.
Figure 12:
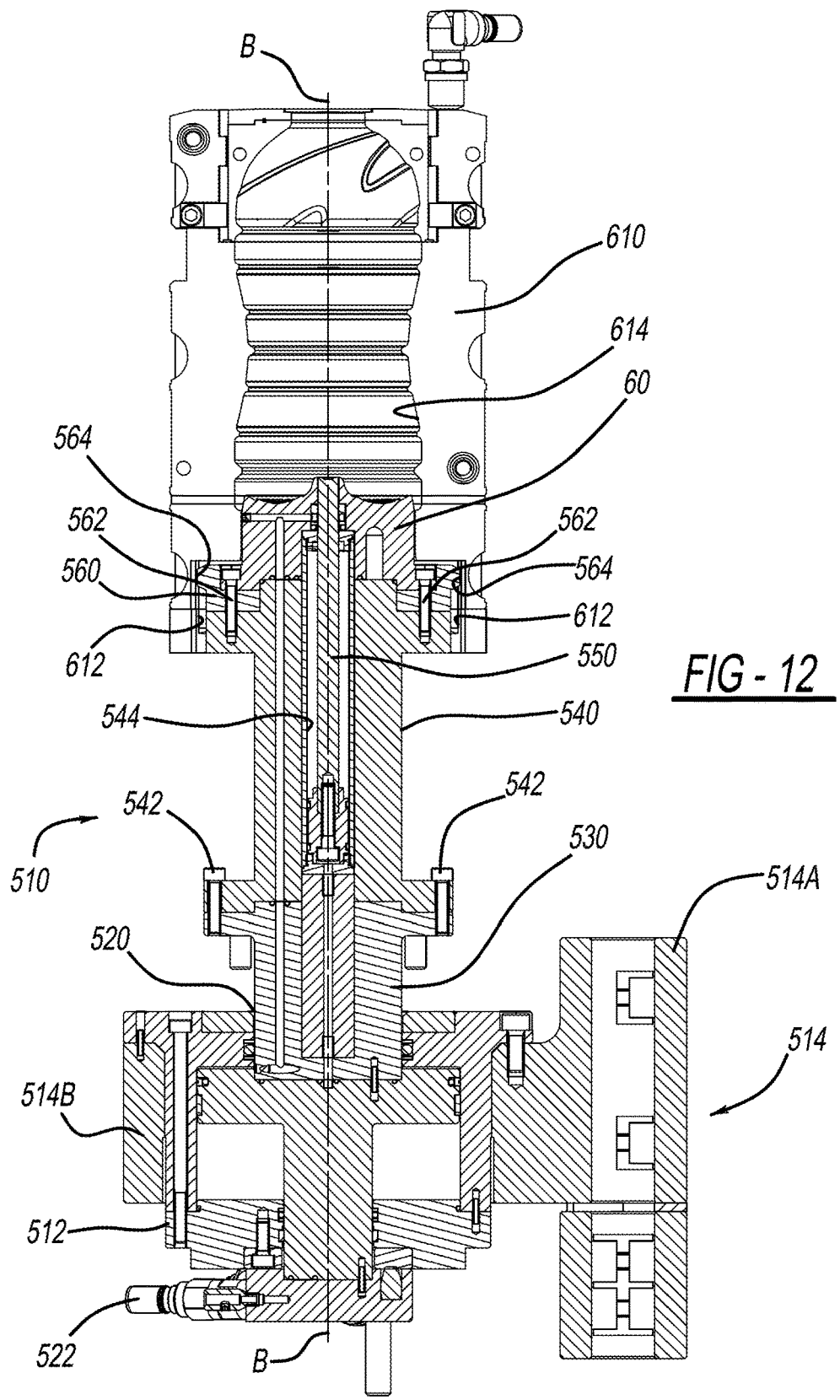
FIG. 12 is a cross-sectional view of the blow molding assembly of FIG. 11.

With reference to FIGS. 11 and 12, another over-stroke/counter-stretch assembly according to the present teachings is generally illustrated at reference numeral 510. The assembly 510 generally includes an over-stroke cylinder 512 mounted to a blow molding machine, such as the console 30 of a blow molding machine, in any suitable manner. For example and as illustrated, the over-stroke cylinder 512 can be mounted to a mount 514 of a blow molding machine. The mount 514 may be unitary modular. For example, when modular the mount 514 may include a first portion 514A coupled to a second portion 514B in any suitable manner. The over-stroke cylinder 512 can be coupled to the mount 514 in any suitable manner. For example, the over-stroke cylinder 512 may be seated within the second portion 514B of the mount 514. The second portion 514B can be generally ring-shaped (and can be a toroidal mounting ring), and the over-stroke cylinder 512 may be seated therein and secured to the second portion 514B with a suitable fastener, for example.

The over-stroke cylinder 512 may define an aperture 520, in which is seated an adaptor 530. The adaptor 530 is slidably movable along longitudinal axis B between a retracted position and an extended position. The extended position is illustrated in FIGS. 11 and 12. In the extended position, a majority of the adaptor can extend out from within the over-stroke cylinder 512. In the retracted position, the adaptor 530 is recessed within the over-stroke cylinder 512, at least as compared to the illustrated extended position. The adaptor 530 can be moved between the retracted and the extended positions in any suitable manner. For example, air can be introduced into the over-stroke cylinder 512 in any suitable manner, such as through one or more air ports 522 of the assembly 510. Any other suitable pneumatic actuation can be used to move the adaptor 530 between the retracted and extended positions, as well as any other suitable actuation provided by a spring, servo, or any other suitable actuation device or method. The adaptor 530 thus allows for changing the overall height of the assembly 510 and stroke length.

A counter-stretch cylinder 540 extends from the adaptor 530. Thus, the counter-stretch cylinder 540 need not extend directly to or within the over-stroke cylinder 512. The counter-stretch cylinder 540 can be unitary with the adaptor 530 or coupled thereto in any suitable manner, such as with any suitable fastener or coupling member 542. The counter-stretch cylinder 540 defines a bore 544, and generally has an overall toroidal shape. The adaptor 530 generally encloses the bottom of the counter-stretch cylinder 540, such as the bottom of the bore 544.

A counter-stretch rod 550 is seated within the bore 44 defined by the counter-stretch cylinder 540. The counter-stretch rod 550 is movable between a retracted position and an extended position. The retracted position is illustrated in FIGS. 11 and 12. In the retracted position, the counter-stretch rod does not extend out from within the mold base 60. In the extended position, the counter-stretch rod 550 does extend out from within the mold base 60, such as in a manner similar to that illustrated in FIGS. 4 and 5 with respect to counter-stretch rod 74. The adapter 530 generally provides for routing of air pressure, heating/cooling fluid, and exhaust connections from the over-stroke cylinder 512 to the counter-stretch cylinder 540.

The mold base 60 is substantially similar to, or the same as, the mold base 60 described above and illustrated in FIGS. 2-10B. Therefore, the mold base 60 can include any of the features described and illustrated in FIGS. 2-10B. The mold base 60 is mounted to an end of the counter-stretch cylinder 540 opposite to the adaptor 530. The mold base 60 can be secured directly to or indirectly to the counter-stretch cylinder 540 in any suitable manner, such as with a mold base support member 560. The mold base support member 560 and the mold base 60 can be secured to the counter-stretch cylinder 540 in any suitable manner, such as with fasteners 562. Extending from an outer periphery of the mold base support member 560 can be a flange 564. The flange 564 can be in cooperation with a mold 610, such as within a receptacle 612 of the mold 610, when the mold 610 is closed as illustrated in FIGS. 11 and 12.

The mold 610 can be any suitable mold, such as the mold 84 described above, or any other suitable mold. As illustrated, the mold 610 is configured to mold a bottle. The mold 610 can be secured to a blow molding machine in any suitable manner, such as to the counsel 30 (described above and illustrated in FIGS. 2-5) of a blow molding machine. For example, the mold 610 can be mounted to the mold holding unit 82, which is connected to the console 30 by way of the hanger 80.

The mold base 60 is movable between a retracted position and an extended position. In the extended position, the mold base 60 extends into a forming portion 614 of the mold 610 so as to contact a preform being molded into a container. The extended position is illustrated in FIGS. 11 and 12. In the retracted position, the mold base 60 does not extend into the forming portion 614. From the illustrated extended position, the mold base 60 is moved downward along the longitudinal axis B by the counter-stretch cylinder 540 and the adaptor 530, and the flange 564 moves downward within the receptacle 612. The mold base 60 is ultimately moved between the extended and retracted positions by the over-stroke cylinder 512 because it is the over-stroke cylinder 512 that moves the adaptor 530 and the counter-stretch cylinder 540.

An exemplary method of using the over-stroke/counter-stretch assembly 510 to mold a container will now be described. Any suitable preform, such as a preform for forming a bottle, is inserted into the mold 610, which is coupled to any suitable blow molding machine. The mold 610 is closed over the preform and the preform is blown into the mold 610, specifically the forming portion 614 of the mold 610. As the preform is initially blown, the mold base 60 is moved to the retracted position such that the mold base 60 does not extend into the forming portion 614 of the mold 610. For the mold base 60 to be in the retracted position, the counter-stretch cylinder 540 and the adaptor 530 must also be in the retracted position in which at least a portion of the adaptor 530 is retracted within the over-stroke cylinder 512.

As the preform is blown into the forming portion 614, the preform is stretched into the forming portion 614 with a stretch rod. To guide the preform into the mold 610, the counter-stretch rod 550 is moved from the retracted position illustrated in FIGS. 11 and 12 to the extended position in which the counter-stretch rod 550 extends out from within the mold base 60 into the forming portion 614 of the mold 610 to contact the preform or closely abut the preform (similar to the position of rod 74 in FIGS. 4 and 5). The counter-stretch rod 550 can be moved from the retracted position to the extended position in any suitable manner, such as by using pressurized air, a spring mechanism, a servo, hydraulics, or any other suitable pneumatic actuation. As the preform is blow, the counter-stretch rod 550 will move from the extended position back to the retracted position to guide the preform into the forming portion 614 towards the mold base 60.

When the preform has been stretched to a final position, or to about a final position, the mold base 60 is moved from the retracted position to the extended position of FIGS. 11 and 12 such that the mold base 60 extends into the forming portion 614 and contacts the preform to form a base of the container. The mold base 60 is moved into the extended position as a result of the over-stroke cylinder 512 moving the adaptor 530 to the extended position of FIGS. 11 and 12, which moves the counter-stretch cylinder 540 to the extended position of FIGS. 11 and 12. After the base of the container being blown is formed, the over-stroke cylinder 512 moves the adaptor 530 and the counter-stretch cylinder 540 to their retracted positions, which moves the mold base 60 to its retracted position by pulling the mold base 60 out from within the forming portion 614 of the mold 610. The mold 610 is then opened and the finished container is removed from the mold 610.

The assembly 510 provides numerous advantages. For example, the assembly 510 combines operation of the mold base 60, the over-stroke cylinder 512, and the counter-stretch rod 550 into a single assembly or unit, which is the over-stroke/counter-stretch assembly 510. The assembly 510 can be easily mounted to any suitable blow molding machine, such as to a new machine or as a retrofit.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A blow molding machine assembly configured to be mounted to a blow molding machine to move a mold base configured to form a container base, the blow molding machine assembly comprising:
   an over-stroke cylinder configured to move the mold base between an extended base position and a retracted base position; and
   a counter-stretch rod movable between a retracted rod position in which the counter-stretch rod does not extend out from within the mold base, and an extended rod position in which the counter-stretch rod extends out from within the mold base;
   wherein the counter-stretch rod is slidably mounted within a counter-stretch cylinder; and
   wherein the counter-stretch cylinder terminates prior to reaching the over-stroke cylinder.

2. The assembly of claim 1, wherein the over-stroke cylinder defines a hollow center in which a base of the counter-stretch rod is seated.

3. The assembly of claim 1, wherein the counter-stretch rod is slidably mounted within the over-stroke cylinder.

4. The assembly of claim 1, wherein the counter-stretch cylinder is connected to the over-stroke cylinder with an adaptor.

5. The assembly of 4, wherein the adaptor extends into the over-stroke cylinder.

6. The assembly of claim 1, wherein the counter-stretch rod is slidably mounted within a toroidal cylinder.

7. The assembly of claim 1, wherein the over-stroke cylinder is configured to be mounted directly to a frame of the blow-molding machine.

8. A blow molding machine assembly configured to be mounted to a blow molding machine to move a mold base configured to form a container base, the blow molding machine assembly comprising:
  an over-stroke cylinder configured to move the mold base along a longitudinal axis of the assembly between an extended base position and a retracted base position; and
  a counter-stretch device movable along the longitudinal axis between a retracted counter-stretch position in which the counter-stretch device does not extend out from within the mold base, and an extended counter-stretch position in which the counter-stretch device extends out from within the mold base;
  wherein the mold base includes a first portion and a second portion, the second portion is movable relative to the first portion to facilitate formation of a bottle base.

9. The assembly of claim 8, the assembly further comprising a main body including a first mounting portion configured to fixedly couple with a second mounting portion.

10. The assembly of claim 8, wherein the blow-molding machine is a two-step blow molding machine.

11. The assembly of claim 8, wherein the over-stroke cylinder is a toroidal cylinder.

12. The assembly of claim 11, wherein the over-stroke cylinder includes an annular flange extending therefrom.

13. The assembly of claim 8, wherein the overstroke cylinder includes a first end and a second end opposite thereto, the mold base is mounted proximate to the first end.

14. The assembly of claim 8, wherein the overstroke cylinder includes a first end and a second end opposite thereto, the mold base is mounted directly to the first end.

15. The assembly of claim 9, further comprising a recess defined at an outer surface of the main body, the recess configured to cooperate with a locking ring of a mold holding unit to couple the mold holding unit to the main body.

16. The assembly of claim 8, wherein the counter-stretch device is slidably mounted within the over-stroke cylinder.

17. The assembly of claim 8, wherein the counter-stretch device includes a base slidably mounted within the over-stroke cylinder, and a counter-stretch rod extending from the base, the counter-stretch rod configured to extend through and out from within an aperture defined by the mold base when the counter-stretch device is in an extended position.

18. The assembly of claim 17, wherein the counter-stretch rod is configured to not extend out from within the aperture when the counter-stretch device is in a retracted position.

19. The assembly of claim 15, wherein the main body includes a base portion and a head portion coupled thereto, the recess defined in the head portion.

20. The assembly of claim 8, wherein the mold base is coupled to the over-stroke cylinder with a collar.

21. The assembly of claim 8, wherein:
  the mold base includes a first base portion defining apertures therein and a second base portion including a plurality of projections;
  the projections do not extend through the apertures, or do not substantially extend through the apertures, when the second base portion is in a retracted position; and
  the projections substantially extend through the apertures when the second base portion is in an extended position.

22. The assembly of claim 8, wherein:
  the mold base includes a first base portion, a second base portion, and an insulator between the first and the second base portions; and
  the first base portion defines a first passageway configured for receipt of a coolant.

23. The assembly of claim 22, wherein the second base portion includes a second passageway configured to receive a liquid configured to heat the second base portion.

24. The assembly of claim 22, wherein the second base portion includes a heating element.

25. The assembly of claim 8, wherein the mold base defines at least one passageway extending therethrough configured to permit airflow to pass out from within the over-stroke cylinder to an outer surface of the mold base to facilitate removal of a bottle off of the base.

26. The assembly of claim 8, wherein the mold base includes a piston configured to move between a retracted position within the mold base to an extended position in which the piston extends out from within the mold base to facilitate removal of a bottle off of the base.

27. The assembly of claim 8, wherein at least one of the counter-stretch device and the over-stroke cylinder are movable with at least one of air, a spring, a servo, or pneumatic actuation.

28. The assembly of claim 8, wherein the over-stroke cylinder is configured to move vertically over a range of up to about 50 mm within an actuation time of 150 milliseconds or less.

29. The assembly of claim 8, wherein an area of the over-stroke cylinder is greater than a maximum surface area of the mold base as projected on a flat surface.

30. The assembly of claim 29, wherein the projected area of the mold base on a flat surface is equal to or less than 110 $cm^2$.

31. The assembly of claim 8, wherein the mold base defines a bore extending therethrough.

32. The assembly of claim 8, wherein the assembly is configured to form containers having a base surface area of greater than 100 $cm^2$.

33. A method for blow molding a container comprising:
  inserting a preform into a mold suspended above an over-stroke/counter-stretch assembly coupled to a blow molding machine;
  closing the mold;
  blowing the preform into the mold when a mold base is positioned out from within the mold by an over-stroke cylinder of the assembly arranged at a retracted position, the mold base includes a first portion and a second portion, the second portion is movable relative to the first portion to facilitate formation of a bottle base;
  guiding the preform into the mold with a counter-stretch rod as the preform is stretched into the mold;
  retracting the counter-stretch rod out from within the mold as the preform is stretched;
  after the preform has been stretched to a final position, moving the mold base into the mold with the over-stroke cylinder;
  after a base of the container has been formed, moving the mold base out from within the mold with the over-stroke cylinder;
  opening the mold; and
  removing the container from the mold.

34. The method of claim 33, further comprising guiding the preform into the mold with the counter-stretch rod slidably mounted within the over-stroke cylinder.

35. The method of claim 33, further comprising retracting the counter-stretch rod within the over-stroke cylinder as the preform is stretched.

\* \* \* \* \*